US008948719B2

(12) United States Patent
Daly et al.

(10) Patent No.: US 8,948,719 B2
(45) Date of Patent: Feb. 3, 2015

(54) DESIGNATION OF CELLULAR BROADCAST MESSAGE IDENTIFIERS FOR THE COMMERCIAL MOBILE ALERT SYSTEM

(75) Inventors: Brian Kevin Daly, Seattle, WA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1607 days.

(21) Appl. No.: 12/246,931

(22) Filed: Oct. 7, 2008

(65) Prior Publication Data
US 2011/0171923 A1 Jul. 14, 2011

Related U.S. Application Data (60) Provisional application No. 61/055,354, filed on May 22, 2008.

(51) Int. Cl.
| | | |
|---|---|---|
| *H04M 11/04* | (2006.01) | |
| *H04W 4/12* | (2009.01) | |
| *H04L 12/12* | (2006.01) | |
| *H04L 12/18* | (2006.01) | |
| *H04W 4/18* | (2009.01) | |
| *H04W 4/22* | (2009.01) | |
| *H04W 52/02* | (2009.01) | |
| *H04W 76/00* | (2009.01) | |

(52) U.S. Cl.
CPC ............... *H04W 4/12* (2013.01); *H04L 12/12* (2013.01); *H04L 12/1895* (2013.01); *H04W 4/18* (2013.01); *H04W 4/22* (2013.01); *H04W 52/0225* (2013.01); *H04W 76/007* (2013.01)
USPC .................. 455/404.1; 455/456.1; 455/414.2; 455/73; 455/466; 701/23; 701/25; 340/902

(58) Field of Classification Search
CPC ...... H04L 12/2829; H04L 67/18; H04L 67/24; H04L 41/0833; H04L 67/12; H04L 1/18; H04L 1/1864; G06F 1/3206; G06F 1/3212; G06F 1/3293; H04M 1/72563; H04M 1/72569; H04M 1/72577; H04M 1/72583; Y02E 60/122; H04H 20/16; H04H 21/814; H04B 1/38
USPC .................. 455/404.1, 456.1, 414.2, 73, 766; 701/23, 25, 201, 204, 225; 390/902
See application file for complete search history.

(56) References Cited

U.S. PATENT DOCUMENTS

| | | | | |
|---|---|---|---|---|
| 5,517,679 | A * | 5/1996 | Yahagi | 340/7.38 |
| 6,377,172 | B1 * | 4/2002 | Neer | 340/539.1 |
| 7,076,204 | B2 * | 7/2006 | Richenstein et al. | 455/3.06 |
| 2003/0143974 | A1 * | 7/2003 | Navarro | 455/404 |

(Continued)

*Primary Examiner* — Nimesh Patel
(74) *Attorney, Agent, or Firm* — Baker & Hostetler LLP (57) ABSTRACT

A Commercial Mobile Alert Message System (CMAS) message comprises a message identifier indicative of the type of alert message in the CMAS message. The identifier is used by a mobile device configured to receive and process CMAS messages to determine if the message alert is to be rendered via the mobile device. The identifier also can be used to place the mobile device in a power conservation state. In an example configuration, the mobile device interprets the message identifier to determine if a subscriber wants the message rendered. If the subscriber wants the message rendered, the mobile device processes and renders the message appropriately. If the subscriber does not want the message rendered, the message is ignored and optionally, the mobile device is placed in a power conservation mode.

18 Claims, 6 Drawing Sheets

(56) References Cited

U.S. PATENT DOCUMENTS

| | | | |
|---|---|---|---|
| 2005/0261012 A1* | 11/2005 | Weiser | 455/466 |
| 2007/0066366 A1* | 3/2007 | Graham | 455/567 |
| 2007/0298757 A1* | 12/2007 | Ahn | 455/404.1 |
| 2009/0130972 A1* | 5/2009 | Andersen et al. | 455/3.01 |
| 2009/0291630 A1* | 11/2009 | Dunn et al. | 455/3.01 |

* cited by examiner

| CMAS Message Class | Message Identifier | Severity | Urgency | Certainty |
|---|---|---|---|---|
| Presidential Alert | MsgID1 | | | |
| CMAS-Extreme Alerts | MsgID2 | Extreme | Immediate | Observed |
| | MsgID3 | Extreme | Immediate | Likely |
| CMAS-Severe Alerts | MsgID4 | Extreme | Expected | Observed |
| | MsgID5 | Extreme | Expected | Likely |
| | MsgID6 | Severe | Immediate | Observed |
| | MsgID7 | Severe | Immediate | Likely |
| | MsgID8 | Severe | Expected | Observed |
| | MsgID9 | Severe | Expected | Likely |
| CMAS Child Abduction Alert | MsgID10 | | | |
| CMAS Test | MsgID11 | | | |
| CMAS Exercise | MsgID12 | | | |
| Operator Defined Test | MsgID13 | | | |

DESIGNATION OF CELLULAR BROADCAST MESSAGE IDENTIFIERS FOR THE COMMERCIAL MOBILE ALERT SYSTEM

CROSS REFERENCE TO RELATED APPLICATIONS

The present application claims priority to U.S. Provisional Patent Application No. 61/055,354, entitled "DESIGNATION OF CELLULAR BROADCAST MESSAGE IDENTIFIERS FOR THE COMMERCIAL MOBILE ALERT SYSTEM," filed May 22, 2008, which is hereby incorporated by reference in its entirety.

TECHNICAL FIELD

The technical field relates generally to cellular communications, and more specifically to the Commercial Mobile Alert System (CMAS). Even more specifically, the technical field is related to minimizing consumption of power of a mobile device configured to receive a CMAS message.

BACKGROUND

Mobile devices, such as cellular telephones for example, draw power from a battery, or batteries. As power is consumed, batteries must be recharged or replaced. A goal among mobile device designers and a desire among mobile device users is longer batter life. Another goal among mobile device designers and a desire among mobile device users is to increase the functionality of mobile devices. The problem however, is that the more functions a mobile device is capable of performing, the more power drawn from its battery, thus decreasing battery life.

SUMMARY

In a mobile device configured to receive Commercial Mobile Alert Message System (CMAS) messages, power consumption of the mobile device is conserved by utilizing message identifiers for designated categories of alerts. The mobile device interprets the message identifiers to determine if the message is pertinent to the mobile device. In an example embodiment, if the message is pertinent to the mobile device, the mobile device can process the message appropriately. And, if the message is not pertinent to the mobile device, the mobile device can conserve power and ignore the message. Power can be conserved by removing power from a receiver of the device; reducing power from the receiver of the device; and/or managing power consumption functions of the device, such as displays or the like.

DETAILED DESCRIPTION OF ILLUSTRATIVE EMBODIMENTS

Message identifiers are utilized to aid a mobile device to determine a characteristic of a broadcast message. In an example embodiment, for Commercial Mobile Alert System (CMAS) messages, the Message Identifier portion of a CMAS message is used to define the category of the cellular broadcast message. This provides a CMAS subscriber the ability to "opt out" from having a category of CMAS message rendered on his/her mobile device. That is, the subscriber can program his/her mobile device to, for example, display only certain types of CMAS messages. This process conserves power consumption by allowing the mobile device to not process specified types of CMAS messages. This process also provides a flexible, user-friendly, opt out option to the subscriber.

The subscriber opt-out process also can be managed to exploit the Discontinuous Reception (DRX) process to obtain maximize battery life and conserve power consumption. DRX is a technique for conserving power consumption of a mobile device. In accordance with DRX operation, a mobile device and a network negotiate phases in which to transfer data. When the mobile device is not receiving data, the mobile device turns its receiver off in order to enter a low power consumption state. To further minimize power consumption, when data in the form of a message is transmitted to the mobile device, in an example configuration, the header or the like of the message is received and analyzed to determine if the message is pertinent to the mobile device. If the message is pertinent to the mobile device, the mobile device then can read the remainder of the message. If the message is not pertinent to the mobile device, the mobile device can go back into power conservation mode. In an example embodiment, the Message Identifier is used in the Schedule Message primitive of the DRX process to indicate to the mobile device that a new message is being broadcast during the scheduled period.

In an example embodiment, Message Identifiers for designated categories of alerts are determined in accordance with three classes of alerts: Presidential, Imminent Threat to Life and Property, and Child Abduction Emergency (AMBER Alert). Imminent Threat is defined to be those alerts in which the Severity is Extreme or Severe, the Urgency is Immediate or Expected, and the Certainty is Observed or Likely. Severe messages are defined to be alerts where the Severity is Extreme, the Urgency is Immediate, and the Certainty is Observed or Likely. The Imminent Threat class of alert is more complex than the Presidential class and the Child Abduction Emergency class. If the Imminent Threat class of alert has only a single message identifier, then the mobile device would not be able to identify, from the DRX Schedule Message, if Imminent Threat alert was "severe" or not "severe". Thus the mobile would be forced to read the cell broadcast message alert attributes of the message prior to going through the subscriber's opt-out processing. The mobile device would have to read the message to determine if the message could be discarded. If this was a message the subscriber was not interested in, the goals of DRX would not be met. The mobile device would have consumed more power than necessary, and the battery life would have been unnecessarily shortened.

In an example embodiment, a Message Identifier is designated for the Presidential class, thus allowing easy identification of a Presidential Alert in the DRX Schedule Message and/or in the broadcast message. A Message Identifier for the Child Abduction Emergency class is designated also allowing the mobile device the ability to quickly identify the Child Abduction Emergency class type of message in the DRX Schedule Message and/or in the cell broadcast itself. Subscriber is provided the option to opt out of any type of alert message, or any combination of alert messages. In an example embodiment, subscribers are given the opportunity to opt out of all but the Presidential alerts. The opt-out process is based on the classification of imminent threat and AMBER Alerts. In an example configuration, presidential messages are always received and processed, and the opt-out process provides a subscriber the choice to opt out of all messages, all severe messages, and/or AMBER alerts.

As described herein message identifiers are defined that facilitate the mobile device to identify the message severity, and thus to minimize the processing required for the mobile device to determine if the message is one which the subscriber desires to see. Utilization of these message identifiers reduces power consumption by the mobile device and prolongs battery life of the mobile device. Various message identifiers are designated, including message identifiers for the "severe" alerts including Presidential Alerts and Child Abduction Alerts; message identifiers for all other "imminent threats"; and message identifiers for CMAS tests and CMAS exercises.

Figure 1:
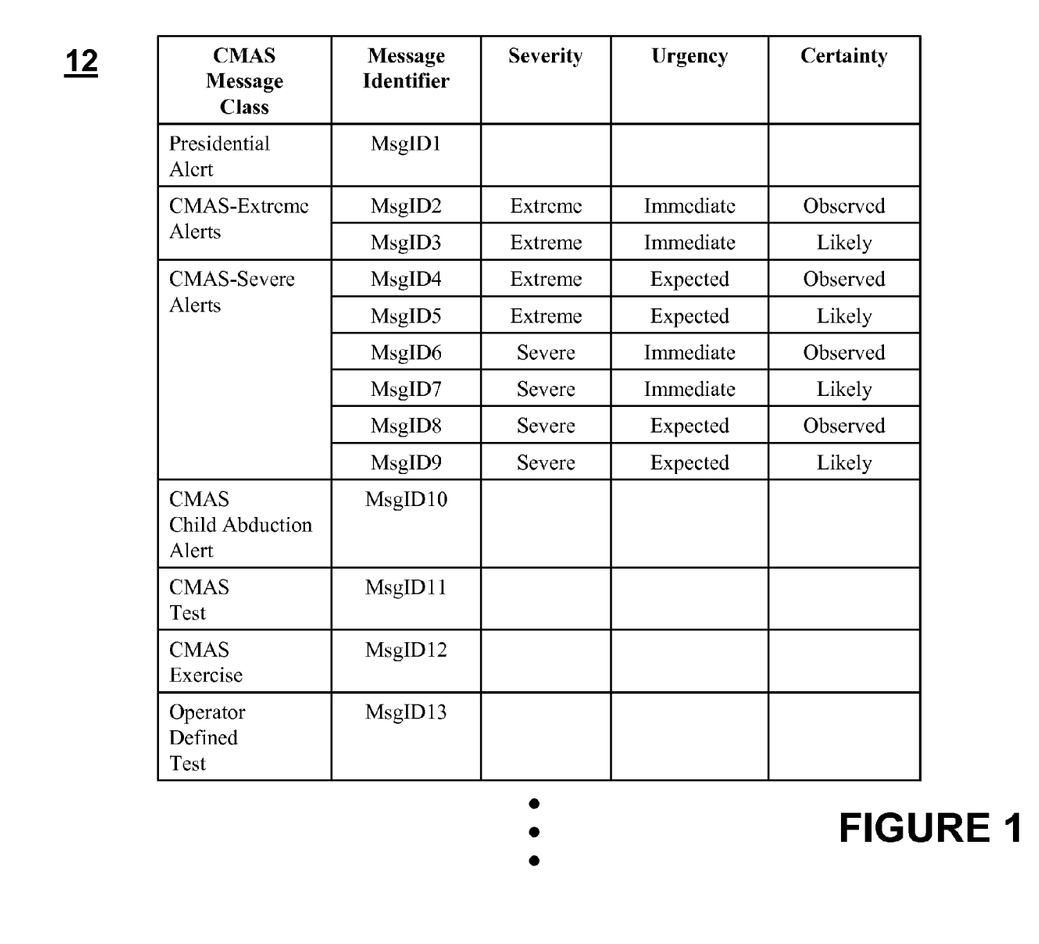
FIG. 1 is a chart depicting example cellular broadcast message identifiers for CMAS alerts.

FIG. 1 is a chart 12 depicting example cellular broadcast message identifiers for CMAS alerts. The CMAS-Presidential Alert message identifier is designated as MsgID1, as shown in the chart of FIG. 1. Considering the Severity, Urgency, and Certainty imminent threat values, for each of the CMAS-Extreme Alerts and the CMAS-Severe Alerts, results in 8 combinations. Each of the 8 combinations is designated as MsgID2 through MsgID9 in the chart of FIG. 1. The CMAS-Child Abduction Alert message identifier is designated as MsgID10, as shown in the chart of FIG. 1. Message identifiers also are reserved for testing and exercise purposes, and designated as MsgID11 for CMAS-Test (e.g., test broadcasts in which no action by the recipient is required), MsgID12 for CMAS-Exercise (e.g., public safety drills), and MsgID13 for Operator Defined Test, as shown in the chart of FIG. 1. It is to be understood the designation of message identifiers, the combination of message identifiers, and the number of message identifiers, as shown in FIG. 1 is exemplary. Any appropriate designation of message identifiers, combination of message identifiers, and/or number of message identifiers can be utilized. For example, additional message identifiers can be designated for implementation at a later date when the need arises (e.g., in order to accommodate new alert types).

Additionally, message identifiers can be indicative of a specific language, thus allowing the mobile device to opt-out of a language or languages that are not of interest. Or, stated differently, allowing the mobile to device to take action only on messages in a language of interest. In an example embodiment, each message identifier can comprise a language designation indicating the language in which the message will be rendered on the mobile device. For example, using the message identifiers shown in FIG. 1, MsgID1 could be MsgID1E for English, MsgID1S for Spanish, MsgID1G for German, etc.

Figure 2:
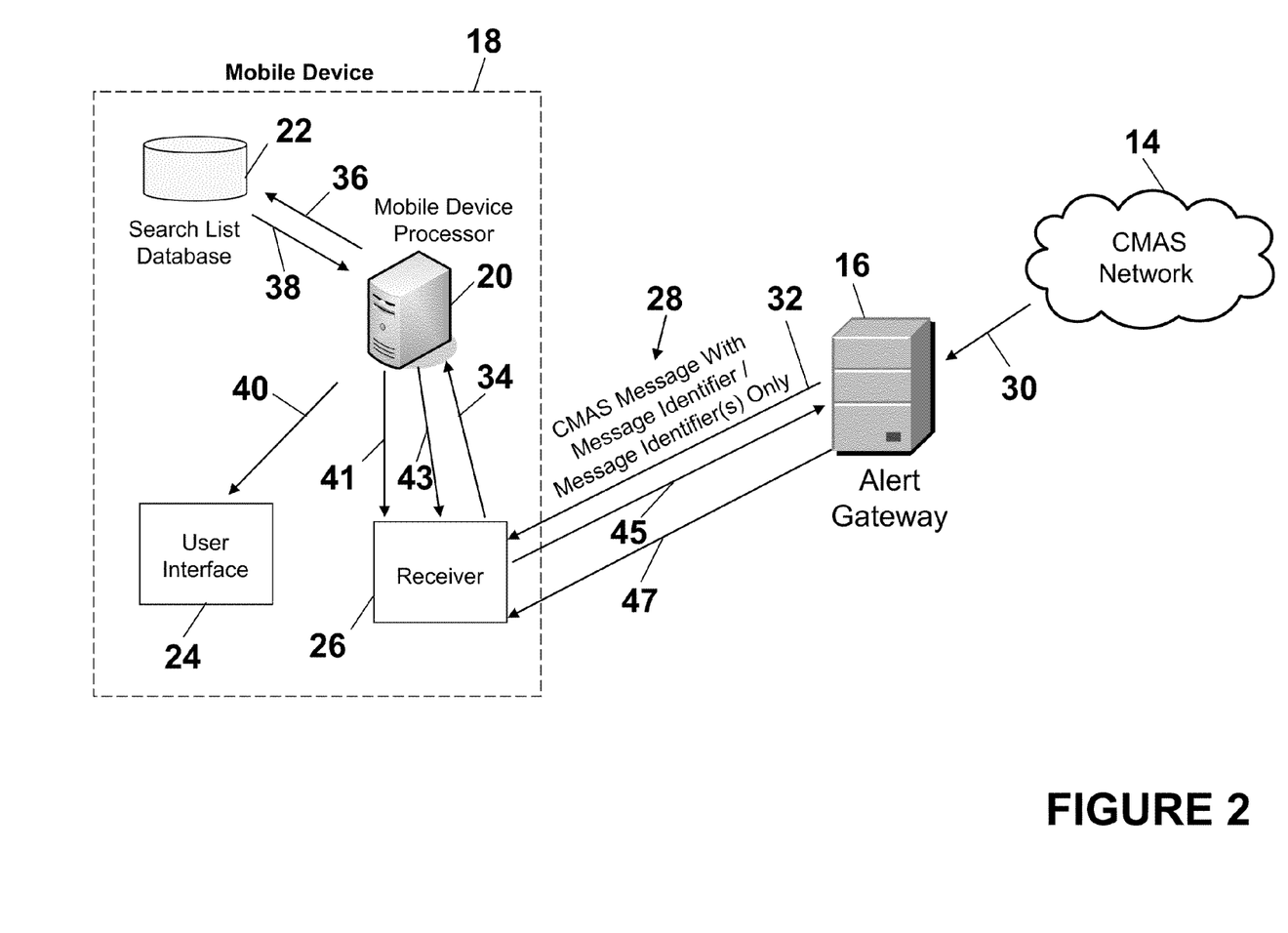
FIG. 2 is a diagram of an example process and system for implementing CMAS message identifiers.

FIG. 2 is a diagram of an example process and system for implementing CMAS message identifiers. In an example embodiment, a Message Identifier parameter identifies the source and/or type of a Cellular Broadcast System (CBS) message and is passed transparently from a Cellular Broadcast Center (CBC), or the like, to the mobile device. For example, "Alert Gateway" (=source), "CMAS-Presidential" (=type) corresponds to one value for CMAS. A number of CBS CMAS messages can originate from the same source (e.g., an Alert Gateway and/or the CMAS network) and/or can be of the same type. These can be distinguished by Serial Number, for example. In an example embodiment, the Message Identifier is binary encoded. Although, it is to be understood, that the Message Identifier can be encoded in accordance with any appropriate encoding scheme.

In an example embodiment, when the mobile device 18 attempts to receive a CBS CMAS message 28, from the CMAS network 14, the mobile device 18 compares the Message Identifier in the CMAS message 28 with information stored in a message identifier search list. The mobile device 18 has the Message Identifiers for CMAS messages stored therein, such as for example in an internal database 22. The "search list" can be used to manage the subscriber "opt out" capabilities and can provide efficiencies in managing battery life and power consumption of the mobile device 18. For example, the CMAS-Presidential Alert message identifier could always be included in the search list. The CMAS-Extreme-Alert-Messages, CMAS-Severe-Alert-Messages, and CMAS-Amber-Alerts could be included in the "search list" by default and could be selectively removed by the subscriber if the subscriber chooses not to receive a category of alerts. If the message is not opted-out, and thus is to be rendered on the mobile device 18, the CMAS message is rendered via the mobile device's user interface 24. Messages can be rendered visually (e.g., via a display or light on the mobile device), via audio/acoustic means (e.g., speech, alert signals), mechanically (e.g., vibration), or a combination thereof. Messages can be rendered visually as images, text, video, multimedia, or a combination thereof. In an example embodiment, a sign language translation of the message is visually rendered on a display of the mobile device via the user interface.

It is emphasized that the diagram depicted in FIG. 2 of the mobile device is exemplary and not intended to imply a specific implementation. Thus, the mobile device can be implemented in a single processor or multiple processors. Multiple processors can be distributed or centrally located. Multiple processors can communicate wirelessly, via hard wire, or a combination thereof.

In an example process for implementing a cellular broadcast message identifier for a CMAS alert, a CMAS alert is provided, at step 30, by the CMAS network to the alert gateway 16. The message identifier, indicating characteristics of the alert, can be incorporated into the CMAS message via the CMAS network 14, via the alert gateway 16, or a combination thereof. In an example embodiment, message identifiers are incorporated into the CMAS message via the CMAS network 14. In an example configuration, a 3GPP compatible CMAS message comprises various parameters including the message identifier. For example, a CMAS message can comprise the following parameters: Message Identifier, Serial Number, Cell List, Repetition Period, Number of Broadcasts Requested, Number of Pages, Data Coding Scheme, CBS Message Information. In an example configuration, the message identifier is the first parameter of the CMAS message.

The CMAS message comprising the message identifier is received by the alert gateway 16 (from step 30). At step 32, in an example embodiment, the alert gateway 16 provides the CMAS alert message 28, having the message identifier incorporated therein, to the mobile device 18. In another example embodiment, to conserve power of the mobile device 18, only the message identifier or list of message identifiers is sent to the mobile device 18. In this example embodiment, the alert gateway 16 extracts the message identifier(s) from the CMAS message(s), and sends, at step 32, only the message identifier(s). Using the received message identifier, or list of message identifiers, the mobile device 18 can then determine which of the messages that it wishes to receive.

The receiver 26 of the mobile device 18 receives the CMAS message or message identifier(s) 28, demodulates and decodes the CMAS message or message identifier(s) 28 as necessary, and provides the CMAS message or message identifier(s) (demodulated and decoded as necessary) to the mobile device processor 20 at step 34. The mobile device processor 20 reads the message identifier(s) of the CMAS message or message identifier(s) and determines if the message(s) is to be rendered by the mobile device 18. The mobile device processor 20 processes the CMAS message or message identifier(s) to determine the message identifier. Upon determining the message identifier, the mobile device processor 20, at step 36, queries the search list database 22 for the message identifier. At step 38, the search list database 22 provides an indication to the mobile device processor 20 if the queried for identifier is in the search list stored in the search list database. In an example embodiment, if an indication of a message identifier is in the search list (found via the query), the subscriber has indicated that the message is to be rendered via the mobile device 18. In this example embodiment, if an indication of a message identifier is not in the search list (not found via the query), the subscriber has opted out of this type of message, and the message is not to be rendered via the mobile device 18.

If the subscriber has not opted-out of a particular CMAS message or message, and only the message or list of message identifiers was provided to the mobile device 18 (at step 32), the mobile device processor 20 provides a signal, at step 43, to the receiver 26, instructing the receiver 26 to request the CMAS message(s). At step 45, the receiver 26 requests the CMAS message(s) from the alert gateway 16. At step 47, the alert gateway 16 provides the CMAS message(s) to the mobile device 18. The CMAS message is processed by the receiver 26 as describe above, and provided to the mobile device processor 20. The message is provided, by the mobile device processor 20, at step 40, to the user interface 24. The message is rendered via the mobile device 18 via the user interface 24. As described above, the message can be rendered visually, via audio/acoustic means, mechanically, or a combination thereof.

If an indication of a message identifier is not in the search list, indicating that the subscriber has opted out of this type of message, and the message is not to be rendered via the mobile device 18, in an example embodiment, the mobile device processor 20, at step 41, instructs the receiver 26 to enter a power conservation mode. This could be accomplished, for example, by removing power from a receiver 26; reducing power from the receiver 26; and/or managing power consumption functions of the device, such as displays or the like.

The mobile device is representative of any appropriate type of mobile such as for example, a portable device, a variety of computing devices including a portable media player, e.g., a portable music player, such as an MP3 player, a Walkman, etc., a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., consumer electronic devices, such as TVs, DVD players, set top boxes, monitors, displays, etc., a public computing device, such as a kiosk, a non-conventional computing device, such as a kitchen appliance, a motor vehicle control (e.g., steering wheel), etc., biometric sensors, radiological sensors, chemical sensors, biological sensors, or a combination thereof.

Figure 3:
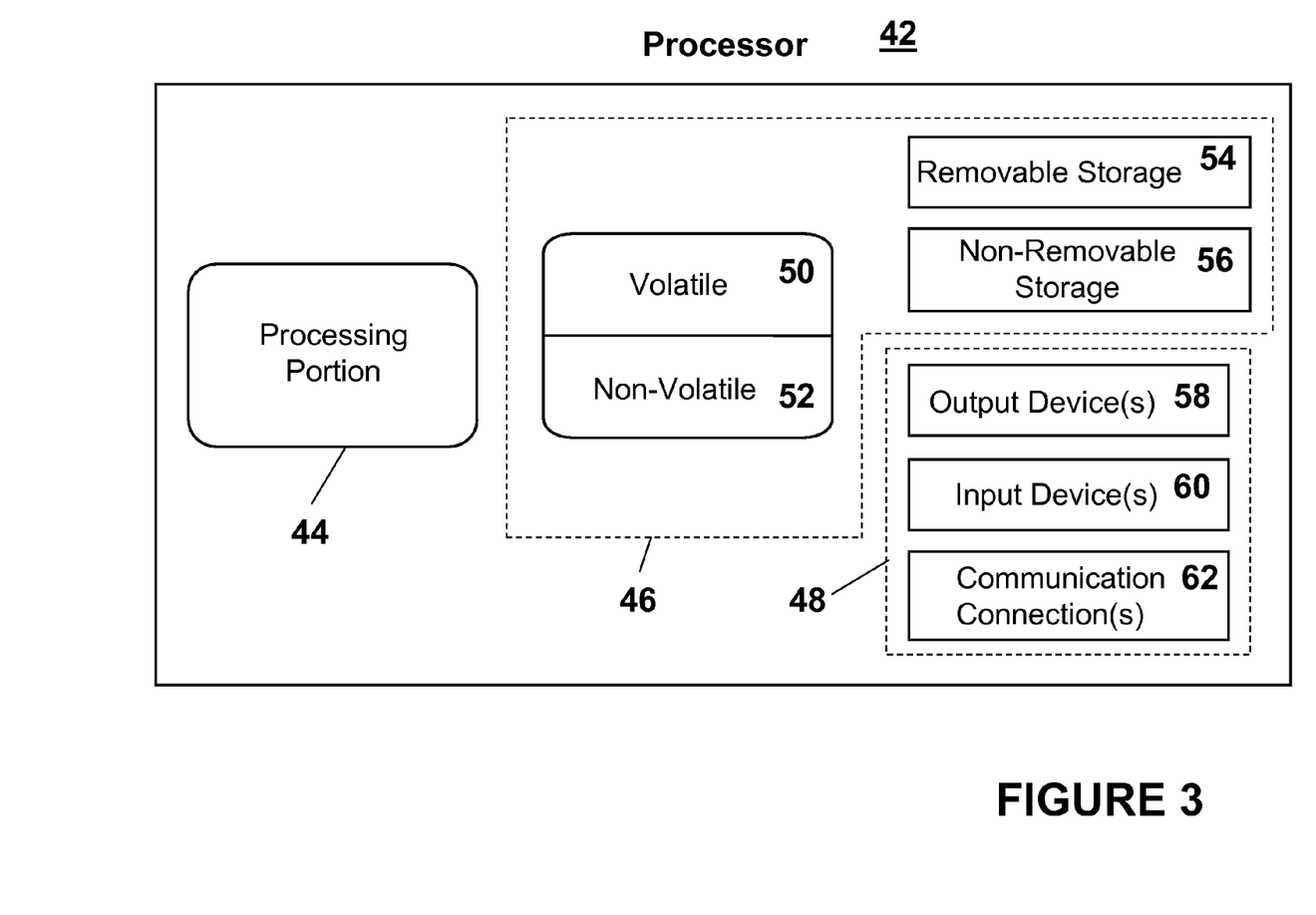
FIG. 3 is a block diagram of an example processor for implementing CMAS message identifiers.

FIG. 3 is a block diagram of an example processor 42 for implementing CMAS message identifiers. In an example configuration, the processor 42 comprises various appropriate components of the cellular broadcast system wireless network, various components of the CMAS network, various components of the mobile device, or a combination thereof. It is emphasized that the block diagram depicted in FIG. 3 is exemplary and not intended to imply a specific implementation. Thus, the processor 42 can be implemented in a single processor or multiple processors. Multiple processors can be distributed or centrally located. Multiple processors can communicate wirelessly, via hard wire, or a combination thereof.

The processor 42 comprises a processing portion 44, a memory portion 46, and an input/output portion 48. The processing portion 44, memory portion 46, and input/output portion 48 are coupled together (coupling not shown in FIG. 3) to allow communications therebetween. The input/output portion 48 is capable of providing and/or receiving components utilized to implement CMAS message identifiers as described above. For example, as described above, the input/output portion 48 is capable of receiving a CMAS message comprising CMAS message identifiers. The processing portion 44 is capable of analyzing CMAS message identifiers, comparing message identifiers in the CMAS message with message identifiers stored in memory, determining a message's status in accordance with a subscriber's opt-out designations, or a combination thereof.

The processor 42 can be implemented as a client processor and/or a server processor. In a basic configuration, the processor 42 can include at least one processing portion 44 and memory portion 46. The memory portion 46 can store any information utilized in conjunction with CMAS message identifiers. For example, as described above, the memory portion 46 is capable of storing a list of message identifiers. Depending upon the exact configuration and type of processor, the memory portion 46 can be volatile (such as RAM) 50, non-volatile (such as ROM, flash memory, etc.) 52, or a combination thereof. The processor 42 can have additional features/functionality. For example, the processor 42 can include additional storage (removable storage 54 and/or non-removable storage 56) including, but not limited to, magnetic or optical disks, tape, flash, smart cards or a combination thereof. Computer storage media can include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor. Any such computer storage media can be part of the processor.

The processor also can contain communications connection(s) 62 that allow the processor 42 to communicate with other devices, for example. Communications connection(s) 62 can be connected to communication media. Communication media typically embody computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor also can have input device(s) 60 such as keyboard, mouse, pen, voice input device, touch input device, etc. Output device(s) 58 such as a display, speakers, printer, etc. also can be included.

The following description sets forth some exemplary telephony radio networks and non-limiting operating environments in which CMAS message identifiers can be implemented. The below-described operating environments should be considered non-exhaustive, however, and thus the below-described network architectures merely show how CMAS message identifiers can be incorporated into existing network structures and architectures. It can be appreciated, however, that CMAS message identifiers can be incorporated into existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), 4G Services such as Long Term Evolution (LTE), etc., as well as to other network services that become available in time. In this regard, the techniques of the utilization of SMS and/or cellular broadcast to receive multimedia alerts can be applied independently of the method of data transport, and do not depend on any particular network architecture, or underlying protocols.

Figure 4:
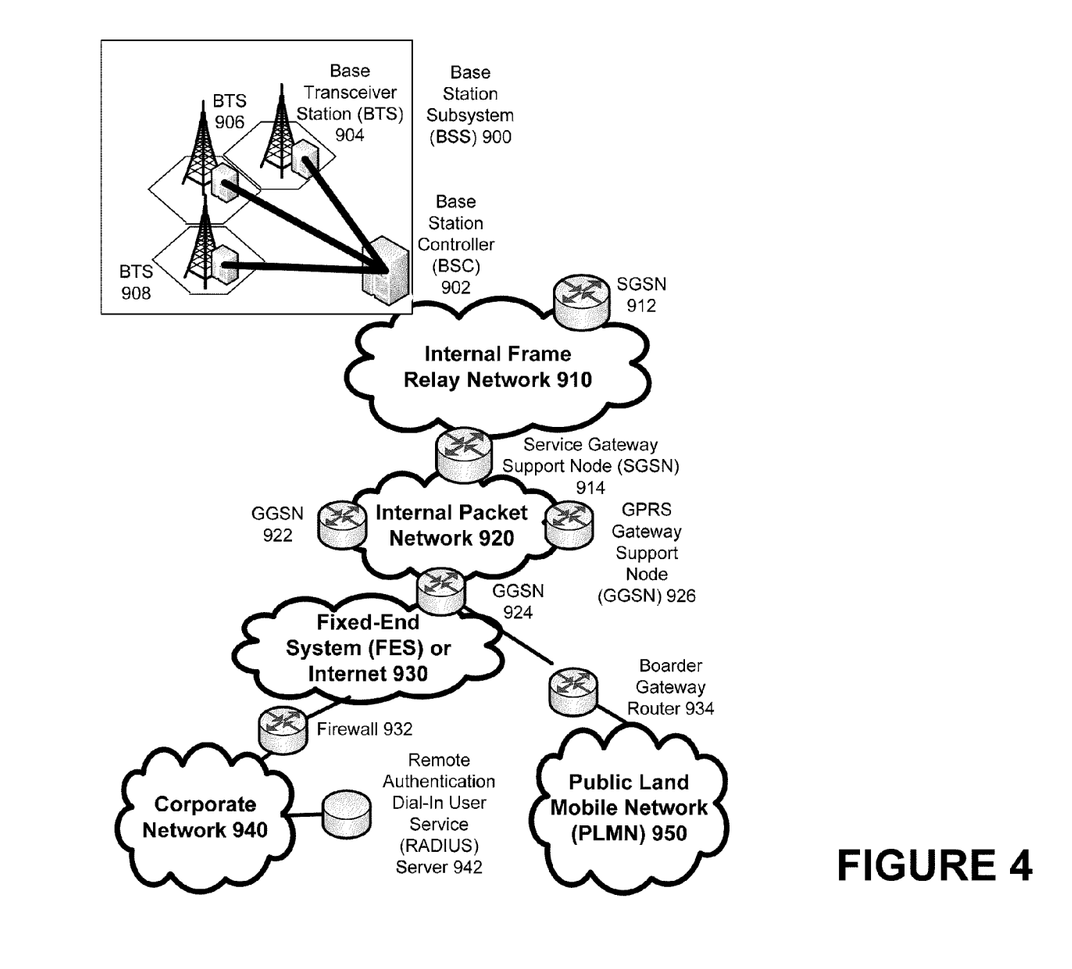
FIG. 4 depicts an overall block diagram of an exemplary packet-based mobile cellular network environment.

FIG. 4 depicts an overall block diagram of an exemplary packet-based mobile cellular network environment, such as a GPRS network, in which CMAS message identifiers can be implemented. In an example configuration, the Cellular radio network 18 is encompassed by the network environment depicted in FIG. 4. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices become connected to the wireless network. In exemplary fashion, the packet traffic originating from user devices (e.g., mobile devices) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
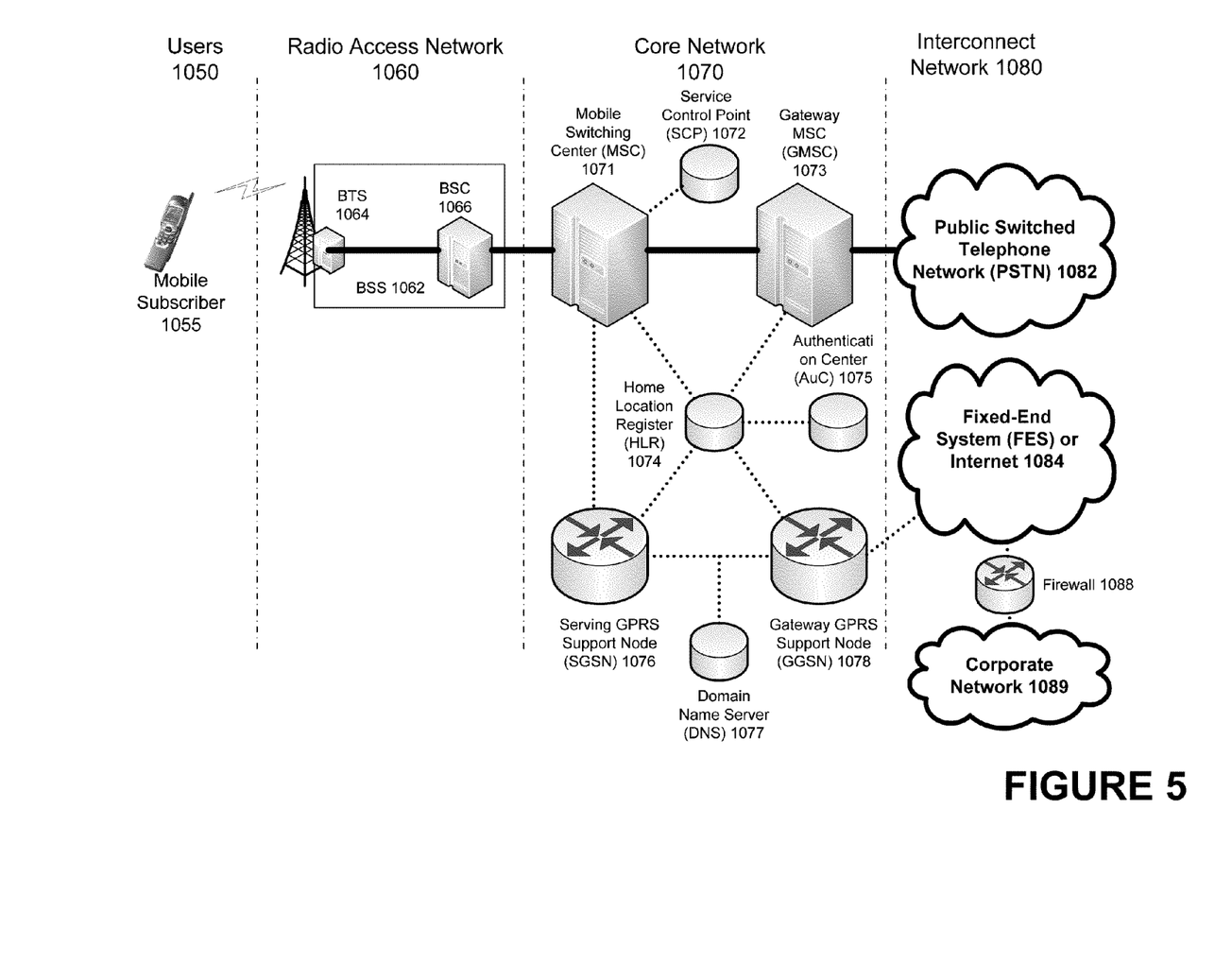
FIG. 5 illustrates an architecture of a typical GPRS network.

FIG. 5 illustrates an architecture of a typical GPRS network segmented into four groups: users 1050, radio access network 1060, core network 1070, and interconnect network 1080. Users 1050 comprise a plurality of end users (though only mobile subscriber 1055 is shown in FIG. 5). In an example embodiment, the device depicted as mobile subscriber 1055 comprises a mobile device. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 5, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when mobile subscriber 1055 initiates the attach process by turning on the network capabilities of the mobile device, an attach request is sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 requests more information from mobile subscriber 1055. This information is used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1055 was attached before, to cancel the location process for mobile subscriber 1055. HLR 1074 then notifies SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1055. The mobile subscriber 1055 uses an algorithm to send the user identification (ID) and password to SGSN 1076. The SGSN 1076 uses the same algorithm and compares the result. If a match occurs, SGSN 1076 authenticates mobile subscriber 1055.

Next, the mobile subscriber 1055 establishes a user session with the destination network, corporate network 1089, by going through a Packet Data Protocol ("PDP") activation process. Briefly, in the process, mobile subscriber 1055 requests access to the Access Point Name ("APN"), for example, UPS.com, and SGSN 1076 receives the activation request from mobile subscriber 1055. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1055.

Once activated, data packets of the call made by mobile subscriber 1055 can then go through radio access network 1060, core network 1070, and interconnect network 1080, in a particular fixed-end system or Internet 1084 and firewall 1088, to reach corporate network 1089.

Thus, network elements that can invoke the functionality of CMAS message identifiers can include but are not limited to Gateway GPRS Support Node tables, Fixed End System router tables, firewall systems, VPN tunnels, and any number of other network elements as required by the particular digital network.

Figure 6:
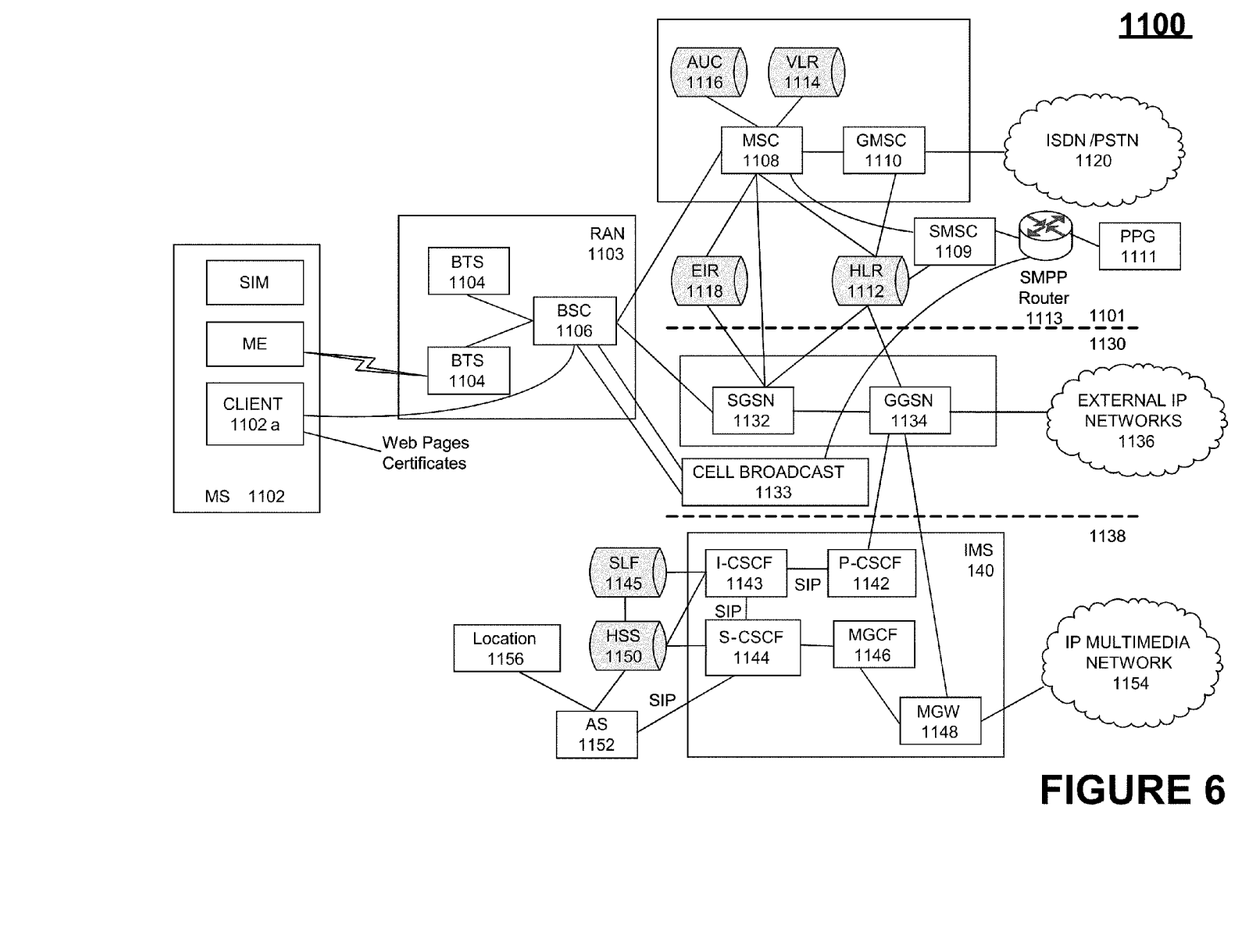
FIG. 6 illustrates another exemplary block diagram view of a GSM/GPRS/IP multimedia network architecture.

FIG. 6 illustrates another exemplary block diagram view of a GSM/GPRS/IP multimedia network architecture 1100 with which CMAS message identifiers can be utilized. As illustrated, architecture 1100 of FIG. 6 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., user device 22) that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of CMAS message identifiers have been described in connection with various computing devices/processor, the underlying concepts can be applied to any computing device, processor, or system capable of utilizing CMAS message identifiers. The various techniques described herein can be implemented in connection with hardware or software or, where appropriate, with a combination of both. Thus, the methods and apparatuses for the utilization of CMAS message identifiers, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for the utilization of CMAS message identifiers. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for CMAS message identifiers also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of CMAS message identifiers. When implemented on a general-purpose processor, the program code combines with the processor to provide a unique apparatus that operates to invoke the functionality of CMAS message identifiers. Additionally, any storage techniques used in connection with the utilization of CMAS message identifiers can invariably be a combination of hardware and software.

While CMAS message identifiers have been described in connection with the various embodiments of the various figures, it is to be understood that other similar embodiments can be used or modifications and additions can be made to the described embodiment for performing the same function of utilizing CMAS message identifiers without deviating therefrom. For example, one skilled in the art will recognize that the utilization of CMAS message identifiers as described in the present application may apply to any environment, whether wired or wireless, and may be applied to any number of such devices connected via a communications network and interacting across the network. Therefore, CMAS message identifiers should not be limited to any single embodiment, but rather should be construed in breadth and scope in accordance with the appended claims.

What is claimed:
1. A method comprising:
receiving, at a mobile device, a Commercial Mobile Alert Message System (CMAS) message comprising a plurality of message identifiers, a selected message identifier of the plurality of message identifiers being indicative of a type of the CMAS message, the plurality of message identifiers comprising:
a message identifier indicative of a CMAS Presidential alert;
a message identifier indicative of a CMAS Extreme alert;
a message identifier indicative of a CMAS Severe alert;
a message identifier indicative of a CMAS Child Abduction alert;
a message identifier indicative of a CMAS Test alert;
a message identifier indicative of a CMAS Exercise alert; and
a message identifier indicative of an operator specific CMAS test alert;
determining, at the mobile device, in accordance with the selected message identifier, if the alert message is to be rendered, the selected message identifier comprising an indication of a language;
if it is determined that the alert message is to be rendered, based at least in part on the language being a language of interest, rendering the alert message; and
if it is determined that the alert message is not to be rendered, based at least in part on the language not being a language of interest, entering a power conservation state of the mobile device receiving the CMAS message.

2. The method in accordance with claim 1, wherein entering a power conservation state further comprises:
managing power consumption functions of the mobile device.

3. The method in accordance with claim 1, wherein the CMAS Extreme alert message identifier comprises at least one of:
a message identifier indicative of a CMAS message having a Severity designation of Extreme, an Urgency designation of Immediate, and a Certainty designation of Observed; or
a message identifier indicative of a CMAS message having a Severity designation of Extreme, an Urgency designation of Immediate, and a Certainty designation of Likely.

4. The method in accordance with claim 1, wherein for a the CMAS Severe alert message identifier comprises at least one of:
a message identifier indicative of a CMAS message having a Severity designation of Extreme, an Urgency designation of Expected, and a Certainty designation of Observed;
a message identifier indicative of a CMAS message having a Severity designation of Extreme, an Urgency designation of Expected, and a Certainty designation of Likely;
a message identifier indicative of a CMAS message having a Severity designation of Severe, an Urgency designation of Immediate, and a Certainty designation of Observed;
a message identifier indicative of a CMAS message having a Severity designation of Severe, an Urgency designation of Immediate, and a Certainty designation of Likely;
a message identifier indicative of a CMAS message having a Severity designation of Severe, an Urgency designation of Expected, and a Certainty designation of Observed; or
a message identifier indicative of a CMAS message having a Severity designation of Severe, an Urgency designation of Expected, and a Certainty designation of Likely.

5. The method in accordance with claim 1, further comprising:
   if it is determined that the alert message is to be rendered, rendering the alert message via at least one of a visual rendering, an acoustic rendering, or a mechanical rendering.

6. The method in accordance with claim 1, further comprising:
   if it is determined that the alert message is to be rendered, visually rendering the alert message via at least one of text, an image, video, or multimedia.

7. The method in accordance with claim 1, further comprising:
   if it is determined that the alert message is to be rendered, visually rendering a sign language translation of the alert message.

8. A mobile device comprising:
   a processor; and
   memory coupled to the processor, the memory comprising executable instruction that when executed by the processor cause the processor to effectuate operations comprising:
      receiving a Commercial Mobile Alert Message System (CMAS) message comprising a plurality of message identifiers, a selected message identifier of the plurality of message identifiers being indicative of a type of the CMAS message, the plurality of message identifiers comprising:
         a message identifier indicative of a CMAS Presidential alert;
         a message identifier indicative of a CMAS Extreme alert;
         a message identifier indicative of a CMAS Severe alert;
         a message identifier indicative of a CMAS Child Abduction alert;
         a message identifier indicative of a CMAS Test alert;
         a message identifier indicative of a CMAS Exercise alert; and
         a message identifier indicative of an operator specific CMAS test alert;
      determining, in accordance with the selected message identifier, if the alert message is to be rendered, the selected message identifier comprising an indication of a language;
      if it is determined that the alert message is to be rendered, based at least in part on the language being a language of interest, rendering the alert message; and
      if it is determined that the alert message is not to be rendered, based at least in part on the language not being a language of interest, entering a power conservation state of the mobile device receiving the CMAS message.

9. The mobile device in accordance with claim 8, wherein entering a power conservation state further comprises:
   managing power consumption functions of the mobile device.

10. The mobile device in accordance with claim 8, wherein a CMAS Extreme alert message identifier comprises at least one of:
   a message identifier indicative of a CMAS message having a Severity designation of Extreme, an Urgency designation of Immediate, and a Certainty designation of Observed; or
   a message identifier indicative of a CMAS message having a Severity designation of Extreme, an Urgency designation of Immediate, and a Certainty designation of Likely.

11. The mobile device in accordance with claim 8, wherein a CMAS Severe alert message identifier comprises at least one of:
   a message identifier indicative of a CMAS message having a Severity designation of Extreme, an Urgency designation of Expected, and a Certainty designation of Observed;
   a message identifier indicative of a CMAS message having a Severity designation of Extreme, an Urgency designation of Expected, and a Certainty designation of Likely;
   a message identifier indicative of a CMAS message having a Severity designation of Severe, an Urgency designation of Immediate, and a Certainty designation of Observed;
   a message identifier indicative of a CMAS message having a Severity designation of Severe, an Urgency designation of Immediate, and a Certainty designation of Likely;
   a message identifier indicative of a CMAS message having a Severity designation of Severe, an Urgency designation of Expected, and a Certainty designation of Observed; or
   a message identifier indicative of a CMAS message having a Severity designation of Severe, an Urgency designation of Expected, and a Certainty designation of Likely.

12. The mobile device in accordance with claim 8, further configured to:
   if it is determined that the alert message is to be rendered, render the alert message via at least one of a visual rendering, an acoustic rendering, or a mechanical rendering.

13. The mobile device in accordance with claim 8, further configured to:
   if it is determined that the alert message is to be rendered, visually render the alert message via at least one of text, an image, video, or multimedia.

14. The mobile device in accordance with claim 8, further configured to:
   if it is determined that the alert message is to be rendered, visually render a sign language translation of the alert message.

15. A computer-readable storage medium that is not a transient signal and is not software per se, the computer-readable storage medium comprising executable instructions that when executed by a processor cause the processor to effectuate operations comprising:
   receiving, at a mobile device, a Commercial Mobile Alert Message System (CMAS) message comprising a plurality of message identifiers, a selected message identifier of the plurality of message identifiers being indicative of a type of the CMAS message, the plurality of message identifiers comprising:
      a message identifier indicative of a CMAS Presidential alert;
      a message identifier indicative of a CMAS Extreme alert;
      a message identifier indicative of a CMAS Severe alert;
      a message identifier indicative of a CMAS Child Abduction alert;
      a message identifier indicative of a CMAS Test alert;
      a message identifier indicative of a CMAS Exercise alert; and
      a message identifier indicative of an operator specific CMAS test alert;

determining, at the mobile device, in accordance with the selected message identifier, if the alert message is to be rendered, the selected message identifier comprising an indication of a language;

if it is determined that the alert message is to be rendered, based at least in part on the language being a language of interest, rendering the alert message; and if it is determined that the alert message is not to be rendered, based at least in part on the language not being a language of interest, entering a power conservation state of the mobile device receiving the CMAS message.

16. The computer-readable storage medium in accordance with claim 15, wherein for a CMAS Extreme alert, the at least one message identifier comprises at least one of:

a message identifier indicative of a CMAS message having a Severity designation of Extreme, an Urgency designation of Immediate, and a Certainty designation of Observed; or a message identifier indicative of a CMAS message having a Severity designation of Extreme, an Urgency designation of Immediate, and a Certainty designation of Likely.

17. The computer-readable storage medium in accordance with claim 15, wherein for a CMAS Severe alert, the at least one message identifier comprises at least one of:

a message identifier indicative of a CMAS message having a Severity designation of Extreme, an Urgency designation of Expected, and a Certainty designation of Observed;

a message identifier indicative of a CMAS message having a Severity designation of Extreme, an Urgency designation of Expected, and a Certainty designation of Likely;

a message identifier indicative of a CMAS message having a Severity designation of Severe, an Urgency designation of Immediate, and a Certainty designation of Observed;

a message identifier indicative of a CMAS message having a Severity designation of Severe, an Urgency designation of Immediate, and a Certainty designation of Likely;

a message identifier indicative of a CMAS message having a Severity designation of Severe, an Urgency designation of Expected, and a Certainty designation of Observed; or a message identifier indicative of a CMAS message having a Severity designation of Severe, an Urgency designation of Expected, and a Certainty designation of Likely.

18. The computer-readable storage medium in accordance with claim 15, wherein entering a power conservation state further comprises:

managing power consumption functions of the mobile device.

\* \* \* \* \*